US012608801B2

(12) United States Patent
Hatsutani et al.

(10) Patent No.: US 12,608,801 B2
(45) Date of Patent: Apr. 21, 2026

(54) INFORMATION PROCESSING APPARATUS, INFORMATION PROCESSING METHOD, AND INFORMATION PROCESSING PROGRAM FOR SUPPORTING INTERPRETATION OF MEDICAL IMAGE

(71) Applicant: FUJIFILM Corporation, Tokyo (JP)

(72) Inventors: Taro Hatsutani, Tokyo (JP); Akimichi Ichinose, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 286 days.

(21) Appl. No.: 18/466,830

(22) Filed: Sep. 14, 2023

(65) Prior Publication Data

US 2024/0095915 A1 Mar. 21, 2024

(30) Foreign Application Priority Data

Sep. 21, 2022 (JP) ................................. 2022-150755

(51) Int. Cl.
*G06T 7/00* (2017.01)
(52) U.S. Cl.
CPC .. *G06T 7/0012* (2013.01); *G06T 2207/20081* (2013.01); *G06T 2207/30096* (2013.01)
(58) Field of Classification Search
None
See application file for complete search history.

(56) References Cited

U.S. PATENT DOCUMENTS

| | | | |
|---|---|---|---|
| 2011/0268338 | A1 | 11/2011 | Collins et al. |
| 2015/0366500 | A1 | 12/2015 | Aoyagi et al. |
| 2017/0011186 | A1 | 1/2017 | Oosawa |
| 2019/0279751 | A1 | 9/2019 | Nakamura et al. |
| 2022/0189009 | A1 | 6/2022 | Wang et al. |

FOREIGN PATENT DOCUMENTS

| | | | | |
|---|---|---|---|---|
| CN | 110210483 A | * | 9/2019 | ............... G06T 7/11 |
| CN | 114140378 | | 3/2022 | |
| JP | 2015191287 | | 11/2015 | |
| JP | 2016007270 | | 1/2016 | |
| JP | 2019153250 | | 9/2019 | |

OTHER PUBLICATIONS

English translation of CN-110210483-A. (Year: 2019).*
"Search Report of Europe Counterpart Application", issued on Feb. 9, 2024, p. 1-p. 8.

* cited by examiner

*Primary Examiner* — Thomas D Lee
(74) *Attorney, Agent, or Firm* — JCIPRNET

(57) ABSTRACT

An information processing apparatus comprising at least one processor, wherein the processor is configured to: acquire a medical image including a plurality of lesion regions; specify a plurality of pieces of first findings information for each of the plurality of lesion regions; and specify second findings information for at least one lesion region among the plurality of lesion regions based on a combination of the plurality of pieces of first findings information.

8 Claims, 6 Drawing Sheets

FIG. 5
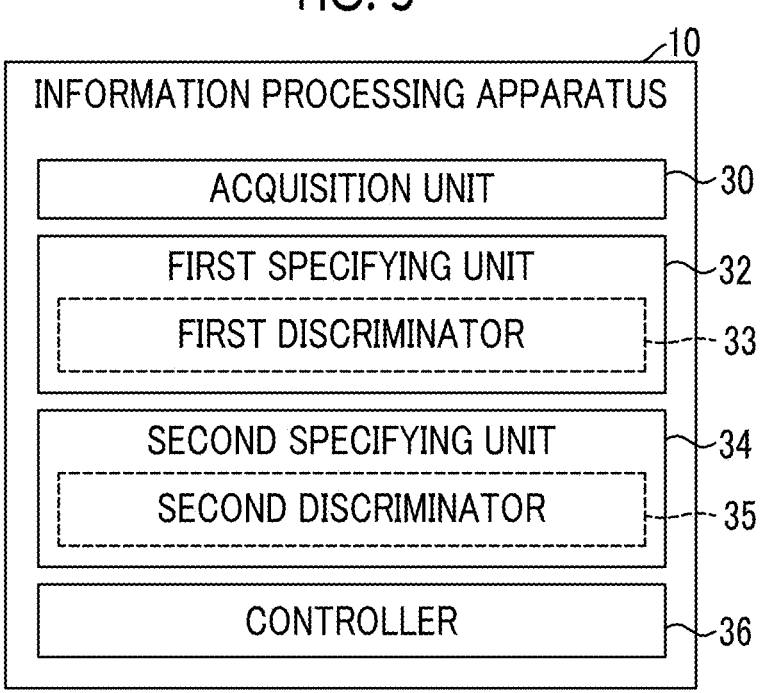
INFORMATION PROCESSING APPARATUS — 10
ACQUISITION UNIT — 30
FIRST SPECIFYING UNIT — 32
FIRST DISCRIMINATOR — 33
SECOND SPECIFYING UNIT — 34
SECOND DISCRIMINATOR — 35
CONTROLLER — 36
FIG. 6
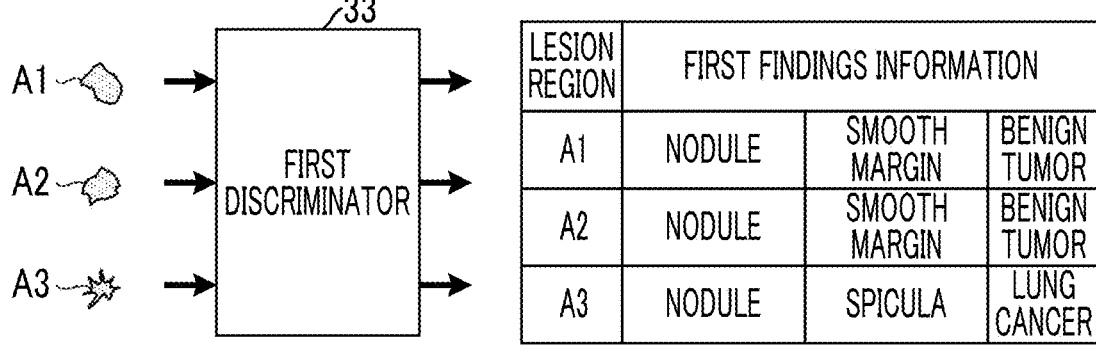
FIG. 7
| LESION REGION | FIRST FINDINGS INFORMATION | | |
|---|---|---|---|
| A1 | NODULE | SMOOTH MARGIN | BENIGN TUMOR |
| A2 | NODULE | SMOOTH MARGIN | BENIGN TUMOR |
| A3 | NODULE | SPICULA | LUNG CANCER |
A1
A2
A3
FIRST DISCRIMINATOR — 33

| LESION REGION | SECOND FINDINGS INFORMATION | | |
|---|---|---|---|
| A1 | NODULE | SMOOTH MARGIN | |
| A2 | NODULE | SMOOTH MARGIN | MULTIPLE LUNG CANCER |
| A3 | NODULE | SPICULA | |

INFORMATION PROCESSING APPARATUS, INFORMATION PROCESSING METHOD, AND INFORMATION PROCESSING PROGRAM FOR SUPPORTING INTERPRETATION OF MEDICAL IMAGE

CROSS-REFERENCE TO RELATED APPLICATIONS

This application claims priority from Japanese Application No. 2022-150755, filed on Sep. 21, 2022, the entire disclosure of which is incorporated herein by reference.

BACKGROUND

Technical Field

The present disclosure relates to an information processing apparatus, an information processing method, and an information processing program.

Related Art

In the related art, image diagnosis is performed using medical images obtained by imaging apparatuses such as computed tomography (CT) apparatuses and magnetic resonance imaging (MRI) apparatuses. In addition, medical images are analyzed via computer aided detection/diagnosis (CAD) using a discriminator in which learning is performed by deep learning or the like, and regions of interest including structures, lesions, and the like included in the medical images are detected and/or diagnosed. The medical images and analysis results via CAD are transmitted to a terminal of a healthcare professional such as a radiologist who interprets the medical images. The healthcare professional such as a radiologist interprets the medical image by referring to the medical image and analysis result using his or her own terminal and creates an interpretation report.

In addition, various methods for supporting the interpretation of medical images have been proposed. For example, JP2019-153250A discloses a technique for creating an interpretation report based on a keyword input by a radiologist and an analysis result of a medical image. In the technique disclosed in JP2019-153250A, a sentence to be included in the interpretation report is created by using a recurrent neural network trained to generate a sentence from input characters.

Further, for example, JP2015-191287A discloses a technique for comparing a feature amount for each of a plurality of regions of interest existing in an examination image with a feature amount of a case lesion in a case image, calculating an individual similarity degree for each region of interest, and searching for similar cases based on a plurality of calculated individual similarity degrees. That is, in the technique disclosed in JP2015-191287A, similar cases are searched for by focusing on the feature amounts of each of the plurality of regions of interest.

Further, for example, JP2016-007270A discloses a technique for specifying a lesion candidate region included in a medical image, dividing the lesion candidate region into a plurality of partial regions, and extracting feature amounts corresponding to each of the plurality of divided partial regions. That is, in the technique disclosed in JP2016-007270A, diagnostic performance of one lesion candidate region is improved by dividing one lesion candidate region into a plurality of partial regions.

The medical image may include a plurality of lesions, and a disease name estimated based on a certain lesion alone may be different from a disease name estimated in consideration of other lesions. For example, in a case where a medical image of a lung includes a plurality of nodules, if there are nodules estimated to be a malignant tumor or a large number of nodules are present, even for a nodule estimated to be a benign tumor by itself, an estimated disease name may be overturned as a metastatic (malignant) tumor. In addition, for example, a lesion that cannot be diagnosed from only a CT image or only an MRI image may become diagnosable by combining the CT image and the MRI image. Therefore, there is a demand for a technique capable of supporting a diagnosis based on a plurality of lesions included in a medical image.

SUMMARY

The present disclosure provides an information processing apparatus, an information processing method, and an information processing program capable of supporting interpretation of medical images.

According to a first aspect of the present disclosure, there is provided an information processing apparatus comprising at least one processor, in which the processor is configured to: acquire a medical image including a plurality of lesion regions; specify a plurality of pieces of first findings information for each of the plurality of lesion regions; and specify second findings information for at least one lesion region among the plurality of lesion regions based on a combination of the plurality of pieces of first findings information.

According to a second aspect of the present disclosure, in the above first aspect, the first findings information may indicate at least one of a type, a property, a position, or a size of the lesion region, and the processor may be configured to specify the second findings information based on at least one of a type, a property, a position, a size, or a number of lesion regions indicated by the plurality of pieces of first findings information.

According to a third aspect of the present disclosure, in the above first aspect or second aspect, the processor may be configured to specify the second findings information based on the plurality of pieces of first findings information and the medical image.

According to a fourth aspect of the present disclosure, in any one of the above first to third aspects, the second findings information may be an update of the first findings information for each of the plurality of lesion regions.

According to a fifth aspect of the present disclosure, in any one of the above first to fourth aspects, the second findings information may be a comprehensive finding specified from the plurality of pieces of first findings information.

According to a sixth aspect of the present disclosure, in any one of the above first to fifth aspects, the processor may be configured to: specify the plurality of pieces of first findings information using a first learning model trained in advance to receive the lesion region as an input and output the first findings information; and specify the second findings information using a second learning model trained in advance to receive the plurality of pieces of first findings information as an input and output the second findings information.

According to a seventh aspect of the present disclosure, in the above sixth aspect, the second learning model may receive the plurality of pieces of first findings information and the medical image as inputs.

According to an eighth aspect of the present disclosure, in any one of the above first to seventh aspects, the medical image may include a plurality of images.

According to a ninth aspect of the present disclosure, there is provided an information processing method comprising: acquiring a medical image including a plurality of lesion regions; specifying a plurality of pieces of first findings information for each of the plurality of lesion regions; and specifying second findings information for at least one lesion region among the plurality of lesion regions based on a combination of the plurality of pieces of first findings information.

According to a tenth aspect of the present disclosure, there is provided an information processing program for causing a computer to execute a process comprising: acquiring a medical image including a plurality of lesion regions; specifying a plurality of pieces of first findings information for each of the plurality of lesion regions; and specifying second findings information for at least one lesion region among the plurality of lesion regions based on a combination of the plurality of pieces of first findings information.

With the information processing apparatus, the information processing method, and the information processing program according to the aspects of the present disclosure, it is possible to support the interpretation of medical images.

BRIEF DESCRIPTION OF THE DRAWINGS

FIG. 5 is a block diagram showing an example of a functional configuration of the information processing apparatus.

FIG. 6 is a diagram showing an example of a medical image.

FIG. 7 is a diagram for describing a method of specifying first findings information.

DETAILED DESCRIPTION

Figure 1:
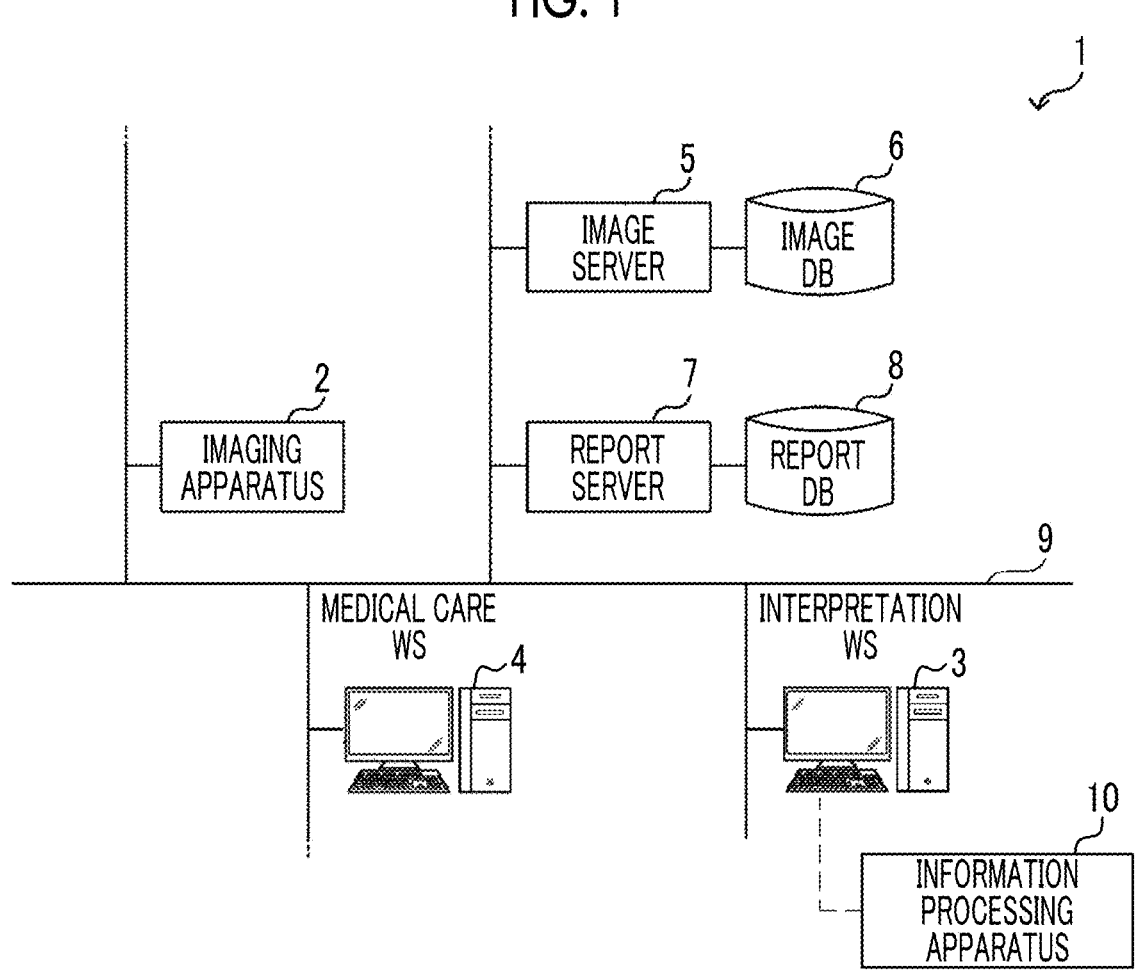
FIG. 1 is a diagram showing an example of a schematic configuration of an information processing system.

Hereinafter, an embodiment of the present disclosure will be described with reference to the drawings. First, a configuration of an information processing system 1 to which an information processing apparatus 10 of the present disclosure is applied will be described. FIG. 1 is a diagram showing a schematic configuration of the information processing system 1. The information processing system 1 shown in FIG. 1 performs imaging of an examination target part of a subject and storing of a medical image acquired by the imaging based on an examination order from a doctor in a medical department using a known ordering system. In addition, the information processing system 1 performs an interpretation work of a medical image and creation of an interpretation report by a radiologist and viewing of the interpretation report by a doctor of a medical department that is a request source.

As shown in FIG. 1, the information processing system 1 includes an imaging apparatus 2, an interpretation work station (WS) 3 that is an interpretation terminal, a medical care WS 4, an image server 5, an image database (DB) 6, a report server 7, and a report DB 8. The imaging apparatus 2, the interpretation WS 3, the medical care WS 4, the image server 5, the image DB 6, the report server 7, and the report DB 8 are connected to each other via a wired or wireless network 9 in a communicable state.

Each apparatus is a computer on which an application program for causing each apparatus to function as a component of the information processing system 1 is installed. The application program may be recorded on, for example, a recording medium, such as a digital versatile disc read only memory (DVD-ROM) or a compact disc read only memory (CD-ROM), and distributed, and be installed on the computer from the recording medium. In addition, the application program may be stored in, for example, a storage apparatus of a server computer connected to the network 9 or in a network storage in a state in which it can be accessed from the outside, and be downloaded and installed on the computer in response to a request.

The imaging apparatus 2 is an apparatus (modality) that generates a medical image showing a diagnosis target part of the subject by imaging the diagnosis target part. Examples of the imaging apparatus 2 include a simple X-ray imaging apparatus, a computed tomography (CT) apparatus, a magnetic resonance imaging (MRI) apparatus, a positron emission tomography (PET) apparatus, an ultrasound diagnostic apparatus, an endoscope, a fundus camera, and the like. The medical image generated by the imaging apparatus 2 is transmitted to the image server 5 and is saved in the image DB 6.

Figure 2:
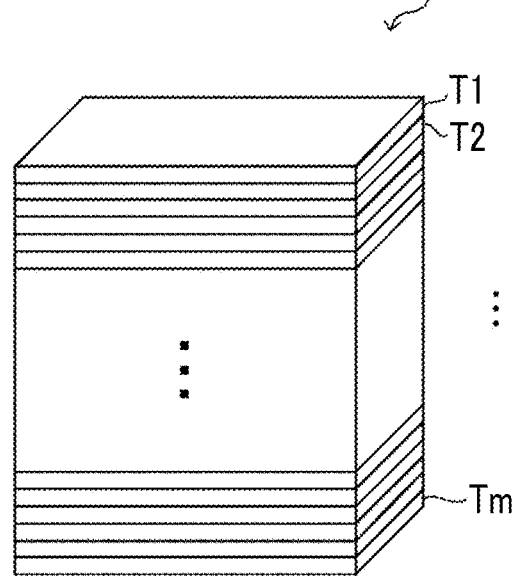
FIG. 2 is a diagram showing an example of a medical image.

FIG. 2 is a diagram schematically showing an example of a medical image acquired by the imaging apparatus 2. A medical image T shown in FIG. 2 is, for example, a CT image consisting of a plurality of tomographic images T1 to Tm (m is 2 or more) representing tomographic planes from the head to the lumbar region of one subject (human body).

Figure 3:
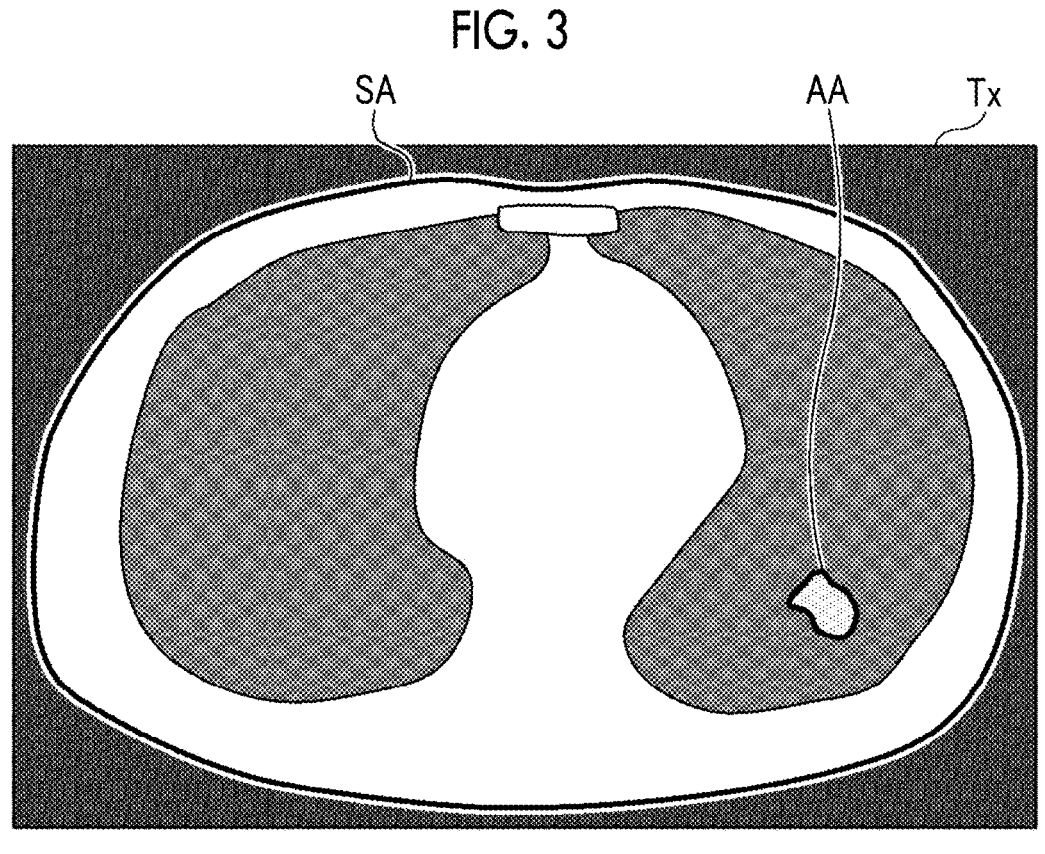
FIG. 3 is a diagram showing an example of a medical image.

FIG. 3 is a diagram schematically showing an example of one tomographic image Tx out of the plurality of tomographic images T1 to Tm. The tomographic image Tx shown in FIG. 3 represents a tomographic plane including a lung. Each of the tomographic images T1 to Tm may include a region SA of a structure showing various organs and viscera of the human body (for example, lungs, livers, and the like), various tissues constituting various organs and viscera (for example, blood vessels, nerves, muscles, and the like), and the like. In addition, each tomographic image may include a lesion region AA such as, for example, nodules, tumors, injuries, defects, and inflammation. In the tomographic image Tx shown in FIG. 3, the lung region is the region SA of the structure, and the nodule region is the lesion region AA. A single tomographic image may include regions SA of a plurality of structures and/or lesion regions AA. Hereinafter, at least one of the region SA of the structure included in the medical image or the lesion region AA included in the medical image will be referred to as a "region of interest".

The interpretation WS 3 is a computer used by, for example, a healthcare professional such as a radiologist of a radiology department to interpret a medical image and to create an interpretation report, and encompasses an information processing apparatus 10 according to the present embodiment. In the interpretation WS 3, a viewing request for a medical image to the image server 5, various image processing for the medical image received from the image server 5, display of the medical image, and input reception of a sentence regarding the medical image are performed. In the interpretation WS 3, an analysis process for medical images, support for creating an interpretation report based on the analysis result, a registration request and a viewing request for the interpretation report to the report server 7, and display of the interpretation report received from the report server 7 are performed. The above processes are performed by the interpretation WS 3 executing software programs for respective processes.

The medical care WS 4 is a computer used by, for example, a healthcare professional such as a doctor in a medical department to observe a medical image in detail, view an interpretation report, create an electronic medical record, and the like, and includes a processing apparatus, a display apparatus such as a display, and an input apparatus such as a keyboard and a mouse. In the medical care WS 4, a viewing request for the medical image to the image server 5, display of the medical image received from the image server 5, a viewing request for the interpretation report to the report server 7, and display of the interpretation report received from the report server 7 are performed. The above processes are performed by the medical care WS 4 executing software programs for respective processes.

The image server 5 is a general-purpose computer on which a software program that provides a function of a database management system (DBMS) is installed. The image server 5 is connected to the image DB 6. The connection form between the image server 5 and the image DB 6 is not particularly limited, and may be a form connected by a data bus, or a form connected to each other via a network such as a network attached storage (NAS) and a storage area network (SAN).

The image DB 6 is realized by, for example, a storage medium such as a hard disk drive (HDD), a solid state drive (SSD), and a flash memory. In the image DB 6, the medical image acquired by the imaging apparatus 2 and accessory information attached to the medical image are registered in association with each other.

The accessory information may include, for example, identification information such as an image identification (ID) for identifying a medical image, a tomographic ID assigned to each tomographic image included in the medical image, a subject ID for identifying a subject, and an examination ID for identifying an examination. In addition, the accessory information may include, for example, information related to imaging such as an imaging method, an imaging condition, an imaging purpose, and an imaging date and time related to imaging of a medical image. The "imaging method" and "imaging condition" are, for example, a type of the imaging apparatus 2, an imaging part, an imaging protocol, an imaging sequence, an imaging method, the presence or absence of use of a contrast medium, a slice thickness in tomographic imaging, and the like. In addition, the accessory information may include information related to the subject such as the name, date of birth, age, and gender of the subject.

In a case where the image server 5 receives a request to register a medical image from the imaging apparatus 2, the image server 5 prepares the medical image in a format for a database and registers the medical image in the image DB 6. In addition, in a case where the viewing request from the interpretation WS 3 and the medical care WS 4 is received, the image server 5 searches for a medical image registered in the image DB 6 and transmits the searched for medical image to the interpretation WS 3 and to the medical care WS 4 that are viewing request sources.

The report server 7 is a general-purpose computer on which a software program that provides a function of a database management system is installed. The report server 7 is connected to the report DB 8. The connection form between the report server 7 and the report DB 8 is not particularly limited, and may be a form connected by a data bus or a form connected via a network such as a NAS and a SAN.

The report DB 8 is realized by, for example, a storage medium such as an HDD, an SSD, and a flash memory. In the report DB 8, an interpretation report created in the interpretation WS 3 is registered. In addition, the report DB 8 may store findings information regarding the medical image. Findings information includes, for example, information obtained by the interpretation WS 3 through image analysis of a medical image using a computer aided detection/diagnosis (CAD) technology, an artificial intelligence (AI) technology, or the like, and information or the like input by a user after interpreting a medical image (details will be described later).

Further, in a case where the report server 7 receives a request to register the interpretation report from the interpretation WS 3, the report server 7 prepares the interpretation report in a format for a database and registers the interpretation report in the report DB 8. Further, in a case where the report server 7 receives the viewing request for the interpretation report from the interpretation WS 3 and the medical care WS 4, the report server 7 searches for the interpretation report registered in the report DB 8, and transmits the searched for interpretation report to the interpretation WS 3 and to the medical care WS 4 that are viewing request sources.

The network 9 is, for example, a network such as a local area network (LAN) and a wide area network (WAN). The imaging apparatus 2, the interpretation WS 3, the medical care WS 4, the image server 5, the image DB 6, the report server 7, and the report DB 8 included in the information processing system 1 may be disposed in the same medical institution, or may be disposed in different medical institutions or the like. Further, the number of each apparatus of the imaging apparatus 2, the interpretation WS 3, the medical care WS 4, the image server 5, the image DB 6, the report server 7, and the report DB 8 is not limited to the number shown in FIG. 1, and each apparatus may be composed of a plurality of apparatuses having the same functions.

The medical image may include a plurality of lesions, and a disease name estimated based on a certain lesion alone may be different from a disease name estimated in consideration of other lesions. For example, in a case where a medical image of a lung includes a plurality of nodules, if there are nodules estimated to be a malignant tumor or a large number of nodules are present, even a nodule estimated to be a benign tumor by itself, an estimated disease name may be overturned as a metastatic (malignant) tumor. In addition, for example, a lesion that cannot be diagnosed from only a CT image or only an MRI image may become diagnosable by combining the CT image and the MRI image.

Therefore, the information processing apparatus 10 according to the present embodiment has a function of supporting the interpretation of the medical image by specifying findings based on a plurality of lesions in a case where the medical image includes the plurality of lesions. The information processing apparatus 10 will be described below. As described above, the information processing appa-
ratus 10 is encompassed in the interpretation WS 3.

Figure 4:
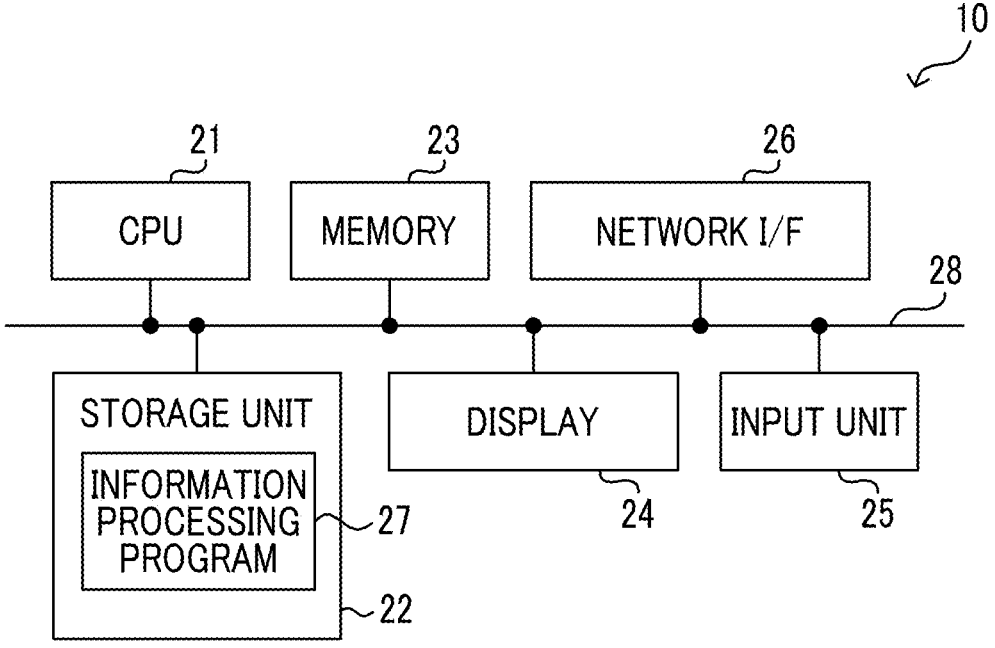
FIG. 4 is a block diagram showing an example of a hardware configuration of an information processing apparatus.

First, with reference to FIG. 4, an example of a hardware
configuration of the information processing apparatus 10
according to the present embodiment will be described. As
shown in FIG. 4, the information processing apparatus 10
includes a central processing unit (CPU) 21, a non-volatile
storage unit 22, and a memory 23 as a temporary storage
area. Further, the information processing apparatus 10
includes a display 24 such as a liquid crystal display, an
input unit 25 such as a keyboard and a mouse, and a network
interface (I/F) 26. The network I/F 26 is connected to the
network 9 and performs wired and/or wireless communica-
tion. The CPU 21, the storage unit 22, the memory 23, the
display 24, the input unit 25, and the network I/F 26 are
connected to each other via a bus 28 such as a system bus
and a control bus so that various types of information can be
exchanged.

The storage unit 22 is realized by, for example, a storage
medium such as an HDD, an SSD, and a flash memory. An
information processing program 27 in the information pro-
cessing apparatus 10 is stored in the storage unit 22. The
CPU 21 reads out the information processing program 27
from the storage unit 22, loads the read-out program into the
memory 23, and executes the loaded information processing
program 27. The CPU 21 is an example of a processor of the
present disclosure. As the information processing apparatus
10, for example, a personal computer, a server computer, a
smartphone, a tablet terminal, a wearable terminal, or the
like can be appropriately applied.

Next, with reference to FIGS. 5 to 9, an example of a
functional configuration of the information processing appa-
ratus 10 according to the present embodiment will be
described. As shown in FIG. 5, the information processing
apparatus 10 includes an acquisition unit 30, a first speci-
fying unit 32, a second specifying unit 34, and a controller
36. As the CPU 21 executes the information processing
program 27, the CPU 21 functions as respective functional
units of the acquisition unit 30, the first specifying unit 32,
the second specifying unit 34, and the controller 36.

The acquisition unit 30 acquires a medical image includ-
ing a plurality of lesion regions obtained by imaging a
subject from the image server 5. Here, the medical image
acquired by the acquisition unit 30 may consist of one
image, or include a plurality of images, such as the medical
image T consisting of the tomographic images T1 to Tm in
FIG. 2. Thus, for example, one image may include a
plurality of lesion regions, or each of a plurality of images
may include a lesion region. Further, for example, in a case
where a medical image includes a plurality of images, at
least some of the images need only include the lesion region,
and some of the images need not include the lesion region.

In the following description, it is assumed that the acqui-
sition unit 30 has acquired a medical image T10 shown in
FIG. 6. The medical image T10 is an image showing a
tomographic plane including a lung, and includes a region
SA of a structure (lung) and a plurality of (three) lesion
regions A1 to A3.

The first specifying unit 32 extracts a region of interest
from the medical image T10 acquired by the acquisition unit
30. That is, the first specifying unit 32 may extract at least
the plurality of lesion regions A1 to A3 from the medical
image T10, and may also extract the region SA of the
structure and the like. As a method for extracting the region
of interest, a known method using a CAD technology, an AI
technology, or the like can be appropriately applied. For
example, the first specifying unit 32 may extract a region of interest from a medical image by using a learning model
such as a convolutional neural network (CNN) that has been
trained to receive the medical image as an input and extract
and output a region of interest included in the medical
image. Further, for example, the first specifying unit 32 may
receive a manual position designation of a region of interest
by a user via the input unit 25 and extract the region of
interest based on the position designation.

In addition, the first specifying unit 32 specifies a plurality
of pieces of first findings information for each of the
plurality of extracted of lesion regions A1 to A3. For
example, as shown in FIG. 7, the first specifying unit 32 may
specify a plurality of pieces of first findings information for
each of the plurality of lesion regions A1 to A3 by inputting
each of the plurality of lesion regions A1 to A3 extracted
from the medical image T10 to a first discriminator 33. The
first discriminator 33 is a learning model such as a CNN
trained in advance to receive the lesion region as an input
and output the first findings information. In the learning
phase of the first discriminator 33, a combination of the
lesion region and the first findings information is used as
training data. The first discriminator 33 is an example of a
first learning model of the present disclosure.

The first findings information indicates, for example,
various findings such as a type (name), a property, a posi-
tion, a measurement value such as a size, and an estimated
disease name of a region of interest included in the medical
image T10. Examples of types (names) include the types of
structures such as "lung" and "liver", and the types of
lesions such as "nodule" and "tumor". The property mainly
means the features of the lesion. For example, in the case of
a lung nodule, findings indicating absorption values such as
"solid type" and "frosted glass type", margin shapes such as
"clear/unclear", "smooth/irregular", "spicula", "lobulation",
and "serration", and an overall shape such as "round shape"
and "irregular shape" can be mentioned. In addition, for
example, there are findings regarding the relationship with
surrounding tissues such as "pleural contact" and "pleural
invagination", and the presence or absence of contrast,
washout, and the like.

The position means an anatomical position, a position in
a medical image, and a relative positional relationship with
other regions of interest such as "inside", "margin", and
"periphery". The anatomical position may be indicated by an
organ name such as "lung" and "liver", and may be
expressed in terms of subdivided lungs such as "right lung",
"upper lobe", and apical segment ("Si"). The measurement
value is a value that can be quantitatively measured from a
medical image, and is, for example, at least one of a size or
a signal value of a region of interest. The size is represented
by, for example, a major axis, a minor axis, an area, a
volume, or the like of a region of interest. The signal value
is represented by, for example, a pixel value in a region of
interest, a CT value in units of HU, or the like. The estimated
disease name is an evaluation result estimated based on the
lesion, and, for example, the disease name such as "cancer"
and "inflammation" and the evaluation result such as "nega-
tive/positive", "benign/malignant", and "mild/severe"
regarding disease names and properties can be mentioned.

FIG. 7 shows an example in which a plurality of pieces of
first findings information are specified for each of the lesion
regions A1 to A3 such that the three pieces of first findings
information of "nodule", "smooth margin", and "benign
tumor" are specified for one lesion region A1, but the present
disclosure is not limited thereto. At least one piece of first
findings information need only be specified for each of the
lesion regions A1 to A3. That is, the "plurality of pieces of first findings information" specified by the first specifying unit 32 of the present disclosure means that there are a plurality of pieces of first findings information for each of the plurality of lesion regions A1 to A3 in total.

The second specifying unit 34 specifies second findings information for at least one lesion region among the plurality of lesion regions A1 to A3 based on a combination of the plurality of pieces of first findings information specified by the first specifying unit 32. The second findings information indicates, for example, similarly to the first findings information, various findings such as a type (name), a property, a position, a measurement value such as a size, and an estimated disease name of a region of interest included in the medical image T10.

Specifically, the second specifying unit 34 may specify the second findings information based on at least one of a type, a property, a position, a measurement value such as a size, or a number of lesion regions indicated by the plurality of pieces of first findings information. For example, the second specifying unit 34 may specify, in a case where the number of lesions of a certain type A is equal to or greater than a predetermined threshold value, second findings information indicating an estimated disease name α that cannot be estimated in a case where the lesion of the type A is present alone. In addition, for example, the second specifying unit 34 may specify second findings information indicating an estimated disease name β that cannot be estimated in a case where each lesion is present alone, based on a combination of lesions of a type B and a type C, which are different from each other.

In addition, for example, the second specifying unit 34 may appropriately combine the conditions related to the measurement values such as the property and the size of the lesion in each of the above examples. For example, the second specifying unit 34 may specify the second findings information indicating an estimated disease name γ in a case where the number of lesions of the type A having a property X is equal to or greater than a predetermined threshold value. Further, for example, the second specifying unit 34 may specify the second findings information indicating an estimated disease name β based on the combination of the lesion of the type B having a property Y and the lesion of the type C having a property Z.

In addition, for example, the second specifying unit 34 may appropriately combine the conditions related to the position of the lesion in each of the above examples. For example, the second specifying unit 34 may specify the second findings information indicating an estimated disease name ε in a case where the number of lesions of the type A present within a predetermined range is equal to or greater than a predetermined threshold value. Further, for example, the second specifying unit 34 may specify the second findings information indicating an estimated disease name in a case where both the lesions of the type B and the type C, which are different from each other, are present within a predetermined range.

The second specifying unit 34 may specify the second findings information based on the plurality of pieces of first findings information specified by the first specifying unit 32 and the medical image acquired by the acquisition unit 30. For example, it may be difficult to indicate the position of the lesion region, such as the relative positional relationship between the lesion regions, by using the first findings information. In this case, the second specifying unit 34 may specify the position of the lesion region based on the medical image and use the specified result for specifying the second findings information.

Note that the second findings information may be an update of the first findings information for each of the plurality of lesion regions A1 to A3. For example, in a case where "benign" is specified as the first findings information, the second specifying unit 34 may replace the first findings information of "benign" with the second findings information of "malignant".

In addition, the second findings information may be a comprehensive finding specified from the plurality of pieces of first findings information specified by the first specifying unit 32. For example, the second specifying unit 34 may newly add the second findings information of "being multiple", which is difficult to specify with the first findings information alone.

As a method of specifying the second findings information, a learning model such as a CNN trained in advance to receive a plurality of pieces of first findings information as an input and output the second findings information can be used. In addition, in a case where the medical image is also used for specifying the second findings information as described above, a learning model that receives the medical image as an input in addition to the plurality of pieces of first findings information may be used. Hereinafter, a method of specifying the second findings information using a second discriminator 35, which is such a learning model, will be described with reference to FIG. 8. The second discriminator 35 is an example of a second learning model of the present disclosure.

Figure 8:
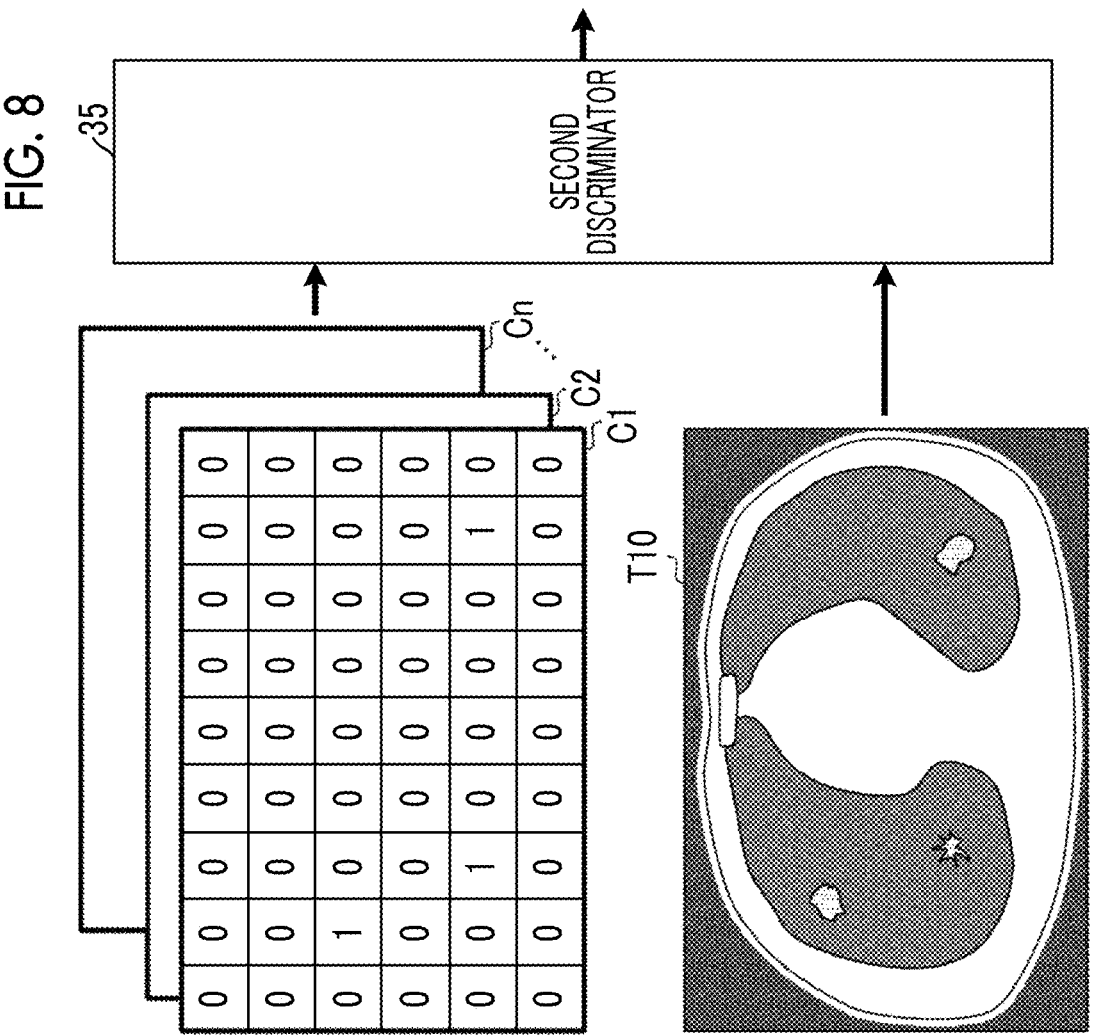
FIG. 8 is a diagram for describing a method of specifying the second findings information.

First, as shown in FIG. 8, the second specifying unit 34 generates maps C1 to Cn in which the first findings information is embedded for each pixel of the medical image T10 based on the plurality of pieces of first findings information specified by the first specifying unit 32. The maps C1 to Cn are generated for each type of first findings information specified by the first specifying unit 32, such as "nodule", "smooth margin", "spicula", "benign tumor", and "lung cancer". That is, n corresponds to the number of types of the first findings information and is 1 or more.

For example, in a case where the first findings information indicating the "nodule" is specified for each of the lesion regions A1 to A3, the second specifying unit 34 assigns "1" to the pixels corresponding to the lesion regions A1 to A3 in the map corresponding to "nodule" and assigns "0" to the other pixels. Further, for example, in a case where the first findings information indicating "spicula" is specified for the lesion region A3 and not specified for the lesion regions A1 and A2, the second specifying unit 34 assigns "1" to the pixel corresponding to the lesion region A3 in the map corresponding to "spicula" and assigns "0" to the other pixels including the lesion regions A1 and A2.

Note that the maps C1 to Cn are not limited to those represented by "1" or "0" indicating the presence or absence of the first findings information. For example, the first discriminator 33 may also output a degree of certainty in a case of specifying the first findings information of the lesion region. In this case, the second specifying unit 34 may generate a map (for example, a heat map) according to the degree of certainty.

In this way, the second specifying unit 34 generates the maps C1 to Cn for all types of first findings information specified by the first specifying unit 32. From the maps C1 to Cn, it is possible to know from which pixel (position) of the medical image T10 the first findings information is specified. In the learning phase of the second discriminator 35, a combination of the maps C1 to Cn and the second findings information is used as training data.

Next, the second specifying unit 34 specifies second findings information for at least one lesion region among the plurality of lesion regions A1 to A3 by inputting the maps C1 to Cn and the medical image T10 to the second discriminator 35. In FIG. 8, a comprehensive estimated disease name "multiple lung cancer" is specified as the second findings information that was not specified as the first findings information (see FIG. 7) for the plurality of lesion regions A1 to A3.

In addition, the second specifying unit 34 may generate a comment on findings including the specified second findings information. As a method for generating a comment on findings, a known method using a CAD technology, an AI technology, or the like can be appropriately applied. For example, the second specifying unit 34 may generate a comment on findings by using a method using machine learning such as the recurrent neural network described in JP2019-153250A. Further, for example, the second specifying unit 34 may generate a comment on findings by embedding the second findings information in a predetermined template.

Figure 9:
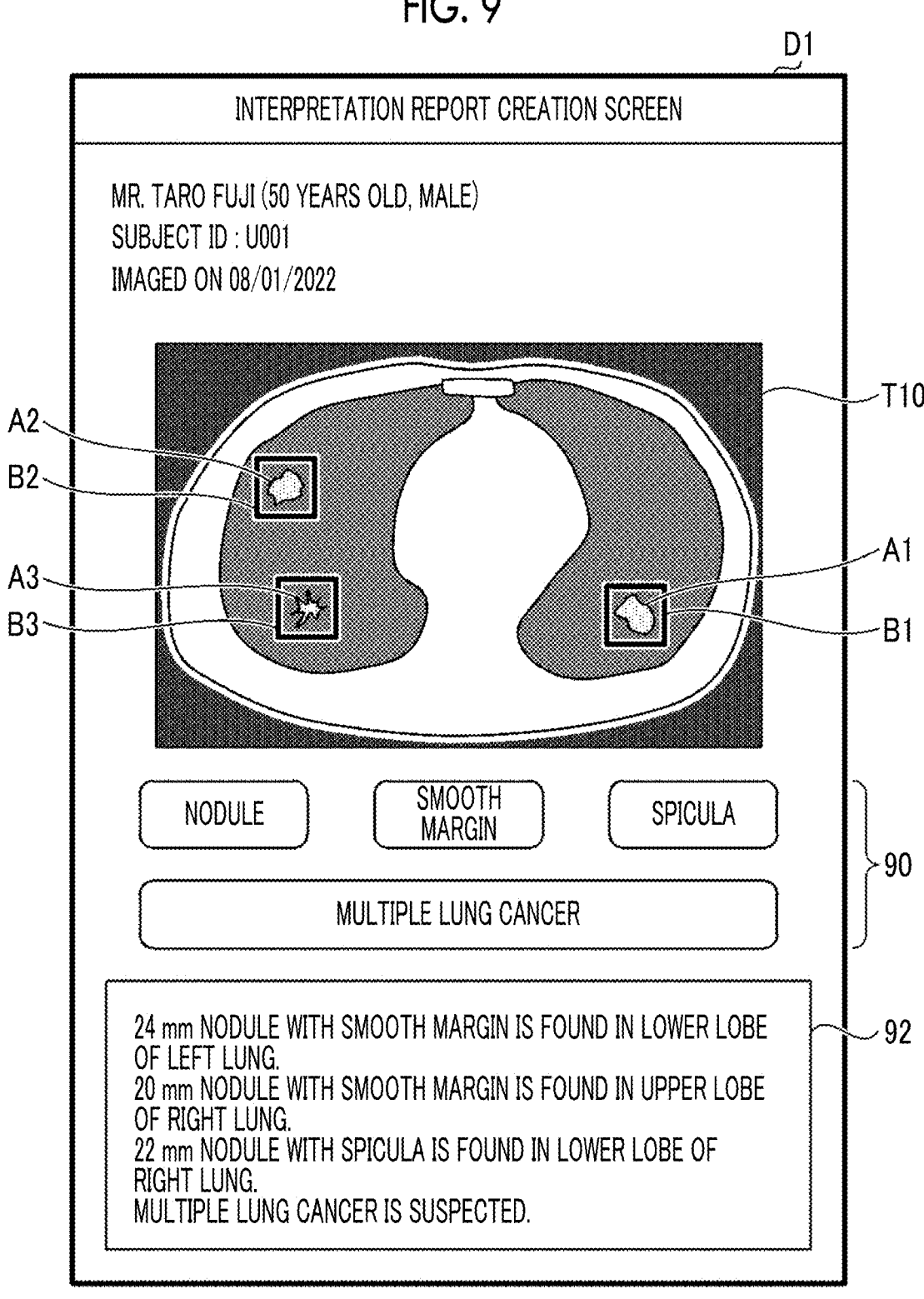
FIG. 9 is a diagram showing an example of a screen displayed on a display.

The controller 36 may perform control to display, on the display 24, the second findings information specified by the second specifying unit 34. FIG. 9 shows an example of a screen D1 displayed on the display 24 by the controller 36. The screen D1 includes second findings information 90.

In addition, the controller 36 may perform control to display, on the display 24, a comment on findings generated by the second specifying unit 34. The screen D1 includes comments on findings 92 regarding each of the lesion regions A1 to A3.

In addition, the controller 36 may perform control to display the medical image T10 on the display 24 by high-lighting the plurality of lesion regions A1 to A3 specified by the first specifying unit 32. The screen D1 includes a medical image T10, in which lesion regions A1 to A3 are emphasized by being surrounded by bounding boxes B1 to B3, respectively.

Note that a highlighting method is not limited to the method using the bounding boxes B1 to B3 as shown in FIG. 9. For example, the controller 36 may attach a marker such as an arrow to the vicinity of the lesion region, change a display method of colors and the like between the lesion regions A1 to A3 and other regions (so-called mask processing), or enlarge and display the portions of the lesion region A1 to A3 in the medical image T10.

Figure 10:
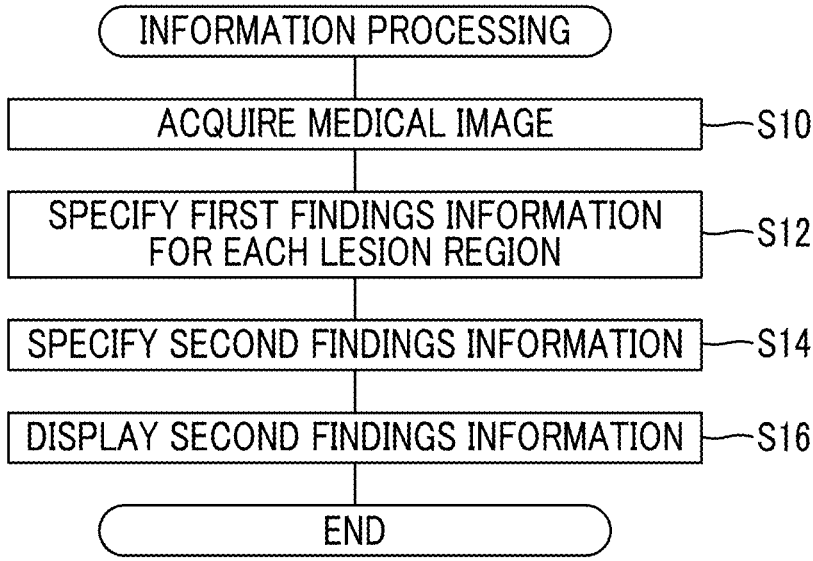
FIG. 10 is a flowchart showing an example of information processing.

Next, with reference to FIG. 10, operations of the information processing apparatus 10 according to the present embodiment will be described. In the information processing apparatus 10, as the CPU 21 executes the information processing program 27, information processing shown in FIG. 10 is executed. The information processing is executed, for example, in a case where the user gives an instruction to start execution via the input unit 25.

In Step S10, the acquisition unit 30 acquires a medical image including a plurality of lesion regions obtained by imaging a subject from the image server 5. In Step S12, the first specifying unit 32 extracts a plurality of lesion regions from the medical image acquired in Step S10, and specifies a plurality of pieces of first findings information for each of the plurality of extracted of lesion regions.

In Step S14, the second specifying unit 34 specifies second findings information for at least one lesion region among the plurality of lesion regions based on a combination of the plurality of pieces of first findings information specified in Step S12. In Step S16, the controller 36 performs control to display, on the display 24, the second findings information specified in Step S14, and ends this information processing.

As described above, the information processing apparatus 10 according to one aspect of the present disclosure comprises at least one processor, and the processor acquires a medical image including a plurality of lesion regions, specifies a plurality of pieces of first findings information for each of the plurality of lesion regions, and specifies second findings information for at least one lesion region among the plurality of lesion regions based on a combination of the plurality of pieces of first findings information.

That is, with the information processing apparatus 10 according to the present embodiment, in a case where the medical image includes a plurality of lesions, since the findings information based on the plurality of lesions can be specified, it is possible to support the interpretation of medical images.

Note that, in the description with reference to FIGS. 6 to 8 of the above-described embodiment, the form in which the plurality of lesion regions A1 to A3 are included in one medical image T10 has been described, but the present disclosure is not limited thereto. As described above, the medical image acquired by the acquisition unit 30 may include a plurality of images, such as the medical image T consisting of the tomographic images T1 to Tm in FIG. 2. Thus, for example, the first specifying unit 32 and the second specifying unit 34 may specify the first findings information and the second findings information for a plurality of lesion regions extracted from different images.

In addition, for example, the medical image acquired by the acquisition unit 30 may be an image obtained by imaging the same part with different types of imaging apparatuses 2, such as a combination of a CT image and an MRI image. In this case, the lesion region included in the CT image and the lesion region included in the MRI image are images obtained by imaging substantially the same lesion, but in the present disclosure, they shall be regarded as separate lesion regions (that is, "a plurality of lesion regions").

In addition, in the above-described embodiment, the first specifying unit 32 and the second specifying unit 34 may receive manual addition and correction by the user via the input unit 25 for the first findings information and the second findings information. Thus, for example, in a case where a correction by the user is received for the first findings information, the second specifying unit 34 may specify the second findings information based on the corrected first findings information.

In the above embodiment, for example, as hardware structures of processing units that execute various kinds of processing, such as the acquisition unit 30, the first specifying unit 32, the second specifying unit 34, and the controller 36, various processors shown below can be used. As described above, the various processors include a programmable logic device (PLD) as a processor of which the circuit configuration can be changed after manufacture, such as a field programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (program).

One processing unit may be configured by one of the various processors, or may be configured by a combination of the same or different kinds of two or more processors (for example, a combination of a plurality of FPGAs or a combination of the CPU and the FPGA). In addition, a plurality of processing units may be configured by one processor.

As an example in which a plurality of processing units are configured by one processor, first, there is a form in which one processor is configured by a combination of one or more CPUs and software as typified by a computer, such as a client or a server, and this processor functions as a plurality of processing units. Second, as represented by a system on chip (SoC) or the like, there is a form of using a processor for realizing the function of the entire system including a plurality of processing units with one integrated circuit (IC) chip. In this way, various processing units are configured by one or more of the above-described various processors as hardware structures.

Furthermore, as the hardware structure of the various processors, more specifically, an electrical circuit (circuitry) in which circuit elements such as semiconductor elements are combined can be used.

In the above embodiment, the information processing program 27 is described as being stored (installed) in the storage unit 22 in advance; however, the present disclosure is not limited thereto. The information processing program 27 may be provided in a form recorded in a recording medium such as a compact disc read only memory (CD-ROM), a digital versatile disc read only memory (DVD-ROM), and a universal serial bus (USB) memory. In addition, the information processing program 27 may be downloaded from an external device via a network. Further, the technology of the present disclosure extends to a storage medium for storing the information processing program non-transitorily in addition to the information processing program.

The technology of the present disclosure can be appropriately combined with the above-described embodiment and examples. The described contents and illustrated contents shown above are detailed descriptions of the parts related to the technology of the present disclosure, and are merely an example of the technology of the present disclosure. For example, the above description of the configuration, function, operation, and effect is an example of the configuration, function, operation, and effect of the parts according to the technology of the present disclosure. Therefore, needless to say, unnecessary parts may be deleted, new elements may be added, or replacements may be made to the described contents and illustrated contents shown above within a range that does not deviate from the gist of the technology of the present disclosure.

What is claimed is:

1. An information processing apparatus comprising at least one processor, wherein the processor is configured to:
   acquire a medical image including a plurality of lesion regions;
   specify a plurality of pieces of first findings information for each of the plurality of lesion regions by using a first learning model trained in advance, wherein the first learning model receives the lesion region as an input and outputs the first findings information; and
   specify second findings information for at least one lesion region among the plurality of lesion regions based on a combination of the plurality of pieces of first findings information by using a second learning model trained in advance, wherein the second learning model receives the plurality pieces of first findings information and the medical image as inputs and outputs the second findings information.

2. The information processing apparatus according to claim 1, wherein:
   the first findings information indicates at least one of a type, a property, a position, or a size of the lesion region, and
   the processor is configured to specify the second findings information based on at least one of a type, a property, a position, a size, or a number of lesion regions indicated by the plurality of pieces of first findings information.

3. The information processing apparatus according to claim 1, wherein the processor is configured to specify the second findings information based on the plurality of pieces of first findings information and the medical image.

4. The information processing apparatus according to claim 1, wherein the second findings information is an update of the first findings information for each of the plurality of lesion regions.

5. The information processing apparatus according to claim 1, wherein the second findings information is a comprehensive finding specified from the plurality of pieces of first findings information.

6. The information processing apparatus according to claim 1, wherein the medical image includes a plurality of images.

7. An information processing method comprising:
   acquiring a medical image including a plurality of lesion regions;
   specifying a plurality of pieces of first findings information for each of the plurality of lesion regions by using a first learning model trained in advance, wherein the first learning model receives the lesion region as an input and outputs the first findings information; and
   specifying second findings information for at least one lesion region among the plurality of lesion regions based on a combination of the plurality of pieces of first findings information by using a second learning model trained in advance, wherein the second learning model receives the plurality pieces of first findings information and the medical image as inputs and outputs the second findings information.

8. A non-transitory computer-readable storage medium storing an information processing program for causing a computer to execute a process comprising:
   acquiring a medical image including a plurality of lesion regions;
   specifying a plurality of pieces of first findings information for each of the plurality of lesion regions by using a first learning model trained in advance, wherein the first learning model receives the lesion region as an input and outputs the first findings information; and
   specifying second findings information for at least one lesion region among the plurality of lesion regions based on a combination of the plurality of pieces of first findings information by using a second learning model trained in advance, wherein the second learning model receives the plurality pieces of first findings information and the medical image as inputs and outputs the second findings information.

* * * * *